(12) United States Patent
Keis et al.

(10) Patent No.: US 6,763,955 B2
(45) Date of Patent: Jul. 20, 2004

(54) HOLDER FOR RECEIVING AND RETAINING TOOLS

(75) Inventors: Anders Keis, Nørre Alslev (DK); Tore Hermansen, Nykøbing Falster (DK)

(73) Assignee: Raaco International A/S, Nykobing (DK)

( * ) Notice: Subject to any disclaimer, the term of this patent is extended or adjusted under 35 U.S.C. 154(b) by 0 days.

(21) Appl. No.: 10/182,525

(22) PCT Filed: Jan. 31, 2001

(86) PCT No.: PCT/DK01/00068
§ 371 (c)(1),
(2), (4) Date: Jul. 31, 2002

(87) PCT Pub. No.: WO01/56751
PCT Pub. Date: Aug. 9, 2001

(65) Prior Publication Data
US 2003/0000902 A1 Jan. 2, 2003

(30) Foreign Application Priority Data
Feb. 1, 2000 (DK) ........................................ 2000 00162

(51) Int. Cl.⁷ .................................................. A47F 5/00
(52) U.S. Cl. .................... 211/70.6; 211/60.1; 211/89.01
(58) Field of Search ........................ 211/66, 70.7, 70.6, 211/69.1, 89.01, 60.1

(56) References Cited
U.S. PATENT DOCUMENTS 2,121,307 A * 6/1938 Swift
3,063,569 A * 11/1962 Huber ...................... 211/89.01
4,325,484 A * 4/1982 Berry ........................... 211/66
4,597,496 A * 7/1986 Kaplan ...................... 211/70.6
5,072,904 A * 12/1991 Taylor ................. 211/89.01 X
5,738,228 A * 4/1998 Bittinger .................... 211/69.1
5,915,572 A * 6/1999 Hancock
5,988,369 A * 11/1999 Hsu ....................... 211/69.1 X
6,412,735 B1 * 7/2002 Mathieu ................. 211/70.6 X

FOREIGN PATENT DOCUMENTS

| DE | 2531790 | 2/1977 | ............ B25H/1/00 |
| DE | 3004312 | 8/1981 | .......... A47G/29/06 |
| GB | 987641 | 3/1965 | |
| GB | 2038613 | 7/1980 | .......... A47G/29/00 |
| SE | 453734 | 2/1988 | ............ B25H/3/00 |

* cited by examiner

Primary Examiner—Robert W. Gibson, Jr.
(74) Attorney, Agent, or Firm—Cooper & Dunham LLP; Donald S. Dowden

(57) ABSTRACT

A holder for receiving and retailing tools, writing utensils, kitchen utensils and the like elongated articles (42) comprises a housing with an elongated slit (2, 3) for receiving the articles (42). Each slit (2, 3) is defined by a flexible lip (9 to 24) projecting from the respective elongated sides of said slit, and which are adapted to abut both sides of the article(s) in question. The holder comprises several rows of lips (9 to 24) extending substantially in parallel, where the lips are arranged in pairs opposite one another and present a mutually complementary, substantially wavy shape. The crests (25) and troughs (26) of each pair of lips (9 to 24) engage one another.

5 Claims, 3 Drawing Sheets

HOLDER FOR RECEIVING AND RETAINING TOOLS

TECHNICAL FIELD

The invention relates to a holder for receiving and retaining tools, writing utensils, kitchen utensils and the like elongated articles, where the holder comprises a housing with an elongated slit for receiving the articles, said slit being defined by a flexible lip projecting from the respective elongated sides of said slit, and where said lip is adapted to abut both sides of the article(s) in question.

BACKGROUND ART

Holders are known for receiving elongated articles. These holders comprise a slit defined by flexible lips projecting from their respective sides, and these lips engage the article in question from both sides so as to retain said article in the slit.

BRIEF DESCRIPTIONS OF THE INVENTION

The object of the invention is to provide a holder presenting a relatively high capacity and retaining the articles in a reliable manner in the inserted position.

The latter is obtained by the holder described above according to the invention being characterised in that the holder comprises several rows of lips extending substantially in parallel, said lips being arranged in pairs opposite one another and presenting a mutually complementary, substantially wavy shape, and that the crests and troughs of each pair of lips engage one another. The substantially wavy shape of the lips has the effect that the insertion of an article causes a displacement sideways of the adjacent portions of the lips, but only within a limited area around the insertion location, only the adjacent crests being affected when seen in a direction away from the article. As a result the articles can be arranged relatively close to one another in a row. In addition, several rows of lips ensure that it is very difficult to tilt the article back and forth lengthwise to the slit, and accordingly each article is retained in a reliable manner in its position.

According to the invention the crests and troughs of the lips may be mutually staggered from row to row, which improves the reliable retaining of the article additionally because said article is affected in different ways by the lips from row to row.

According to the invention it is particularly advantageous when the elongated sides of the slit are formed by housing parts of a plastic material, and when the lips are made by way of injection moulding of an elastomeric material and are thereby permanently connected to the associated housing part. The resulting manufacture of the holders is particularly easy.

The above housing parts may furthermore according to the invention be hingedly interconnected and comprise co-operating releasable locking means for retaining said housing parts in an interconnecting position while forming the slit. As a result it is very easy to open and close the slit when portions of an article get stuck inside said slit.

Finally, the hinged connection may according to the invention be provided by means of a film hinge cast integral with the housing parts with the result that all the parts of the holder can be cast integral by way of injection moulding followed by a folding so as to form the slit.

BRIEF DESCRIPTION OF THE DRAWINGS

The invention is explained in greater detail below with reference to the accompanying drawings, in which.

BEST MODE FOR CARRYING OUT THE INVENTION

Figure 1:
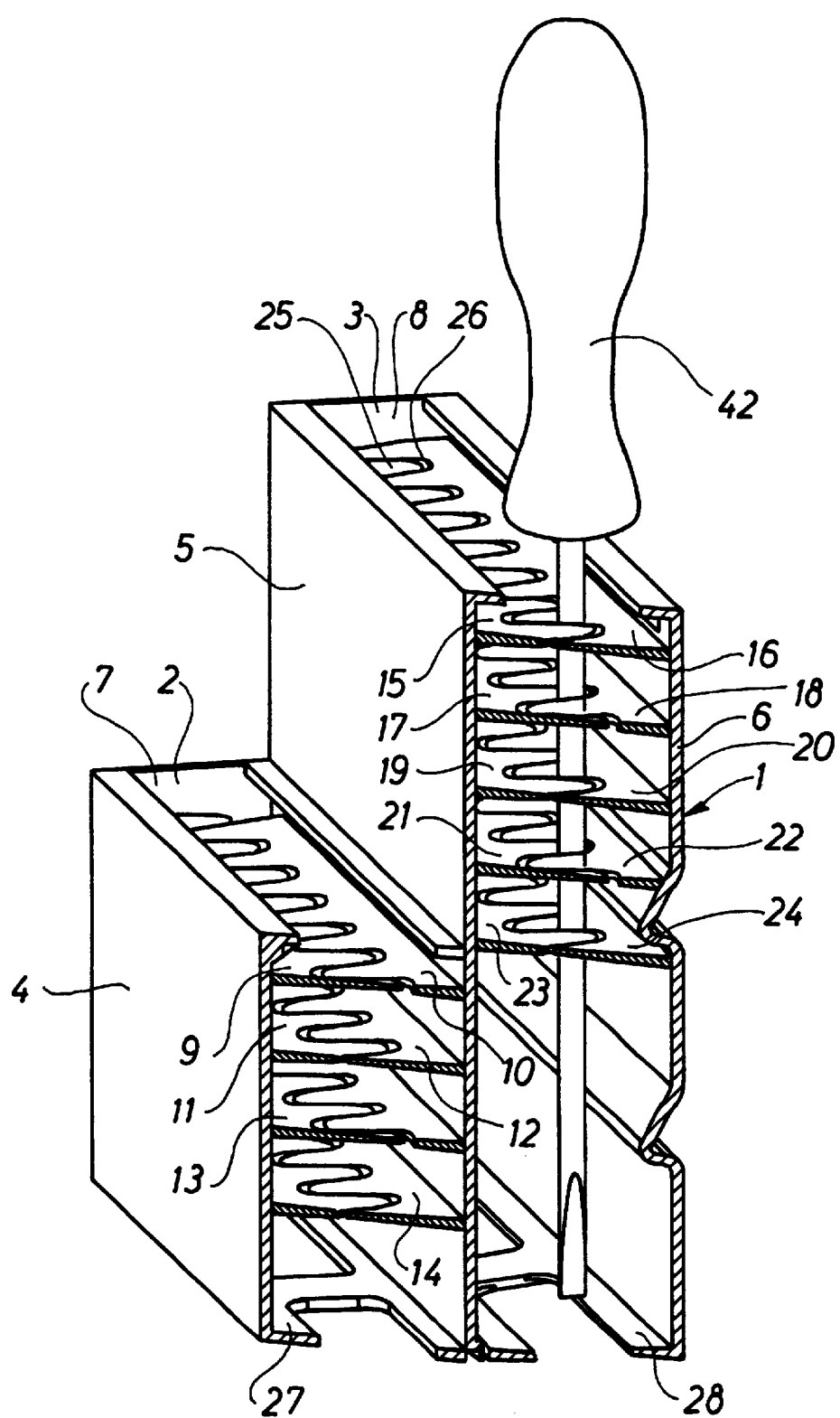
FIG. 1 is a vertical, cross sectional view of a holder according to the invention with two slits, where one slit receives an elongated article in form of a screwdriver.

The holder of FIG. 1 is designated the general reference numeral 1 and comprises two slits 2 and 3 of varying depths. Both slits are defined by substantially plane housing parts 4, 5 and 6, where one housing part 5 forms part of both slits 2 and 3. These housing parts 4, 5 and 6 form longitudinal side walls in the slits 2 and 3, which at the ends are defined by end walls 7, 8, only the end walls 7, 8 at one end of the slits 2, 3 appearing from FIG. 1.

At both sides of the slits 2, 3, the side walls 4, 5 and 6 of said slits 2, 3 carry a row of juxtaposed projecting lips which are arranged in pairs opposite one another. The rows of lips present such a wavy shape that in a complementary manner the crests of each pair of lips 9 to 24 project into the troughs of said pair. An example of a crest is shown at the reference numeral 25 and a trough at the reference numeral 26. These wavy lips are made of a resilient elastomeric material which can be rubber-like. The end walls 7 and 8 and the side walls 4 to 6 of the holder define together with the bottom walls 27, 28 the housing of said holder 1, and these walls can be made of a moulded plastic material, such as polypropylene. The lips 9 to 24 can be secured to the side walls 4 to 6 in any suitable manner, such as by means of glue or by being received in slots (not shown). However, the side walls 4 to 6 and the lips 9 to 24 are advantageously cast integral by way of injection moulding substantially in the same mould, viz. first the side walls 4 to 6 are cast and then the lips 9 to 24 are cast on top of said side walls.

Figure 2:
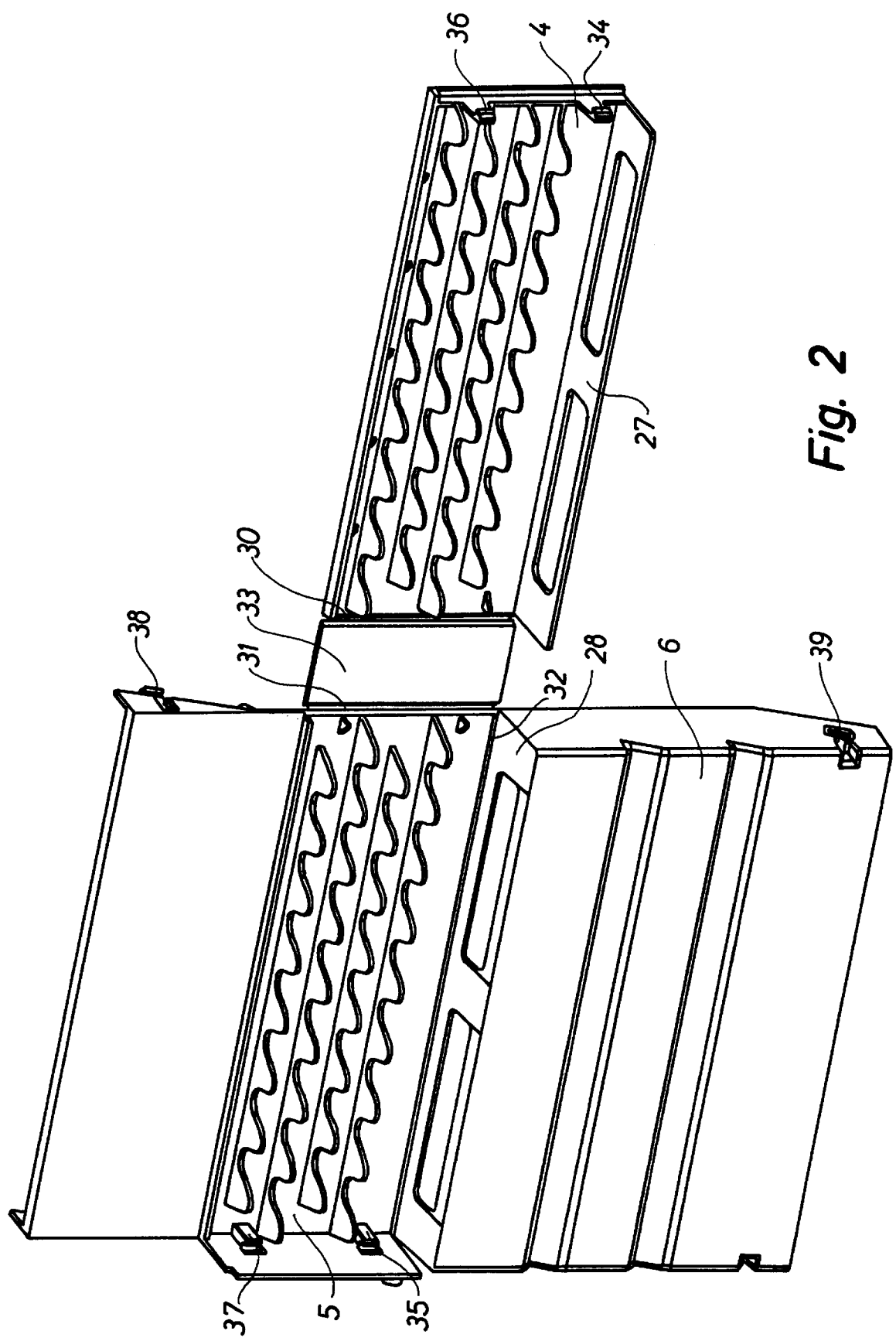
FIG. 2 illustrates the holder of FIG. 1 in the extended state, and FIG. 3 corresponds to FIG. 2, but seen from another side.
Figure 3:
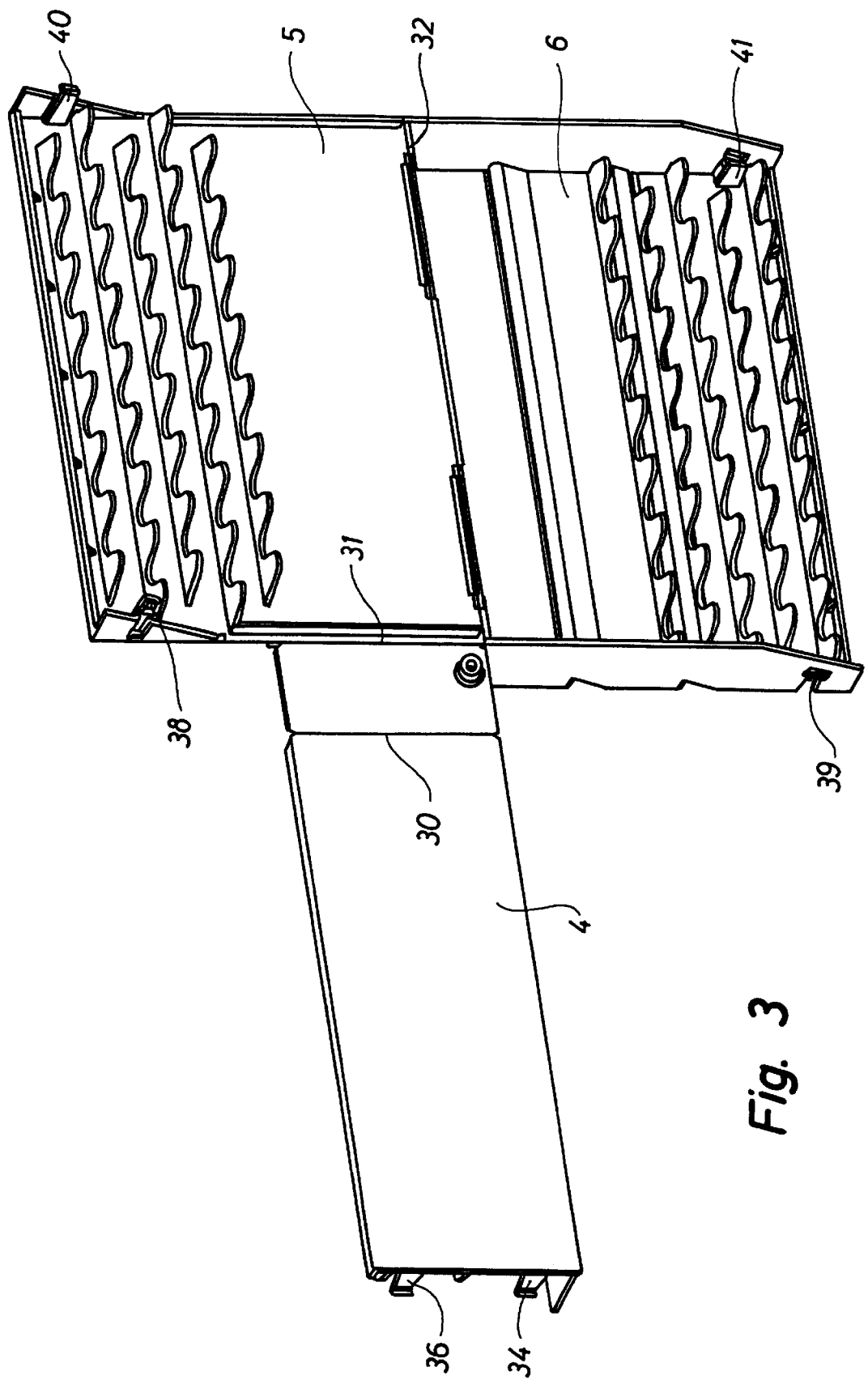

As illustrated in FIGS. 2 and 3, the wall portions 4, 5 and 6 are suitably cast integral by way of injection moulding in such a manner that they are interconnected by means of film hinges 30, 31 and 32 and an end wall-forming member 33 which in the folded state represents an end wall in the slit 2.

After the manufacturing process, the housing parts or the side walls 4 to 6 of the holder are bent about the film hinges 30, 31 and 32 while forming the slits 2 and 3, said housing parts or side walls being kept together in the slit-forming state by means of co-operating locking means 34, 35, 36, 37 and 38, 39 and 40, 41, respectively. These locking means 34 to 41 are suitably formed such that they operate by way of a snap action.

In the assembled or folded state shown in FIG. 1, the holder is suited for receiving elongated articles, such as a screwdriver 42 inserted downwards into a suitable slit, such as the slit 3. The downward insertion of the screwdriver 42 implies that it is inserted downwards between adjacent portions of the opposing lips 15 to 24 of each pair of lips. These pairs of lips are suitably arranged so as to be mutually staggered whereby the crests are displaced relative to the longitudinal direction of the slit at a quarter of a wavelength relative to the crests/troughs of the adjacent pair of lips 15 to 24. The latter applies also to the lips 9 to 14 of the second slit 2 which is not as deep as the slit 3.

Each article 42 has only an effect on the adjacent portions of the lips 15 to 24, and accordingly an additional longitudinal article can be inserted downwards close to said first article 42 without interfering with the safe and reliable retaining of said article 42. In this manner a single slit 2, 3 can receive relatively many articles, which are all retained in a reliable and secure manner inside the slits.

The invention has been described with reference to a preferred embodiment. Many modifications can be carried out without thereby deviating from the scope of the invention. The wavy shape of the lips can for instance be provided in various ways with different curvatures and different sizes. The holders can also comprise no more than one single slit or several slits.

What is claimed is:

1. A holder for receiving and retaining tools, writing utensils, kitchen utensils and the like elongated articles, the holder comprising:

a housing formed with an elongated slit for receiving the articles, said slit having elongated sides and being defined by a plurality of rows of flexible lips projecting from respective elongated sides of said slit, said lips being adapted to abut the article(s), being arranged in pairs opposite one another, and defining a mutually complementary, substantially wavy shape having crests and troughs of each pair of lips engaged with one another.

2. A holder for receiving and retaining tools, writing utensils, kitchen utensils and the like elongated articles, where the holder comprises a housing with an elongated slit for receiving the articles, said slit having elongated sides and being defined by a flexible lip projecting from the respective elongated sides of said slit, and where said lip is adapted to abut both sides of the article(s), wherein the holder comprises several rows of lips extending substantially in parallel, said lips being arranged in pairs opposite one another and presenting a mutually complementary, substantially wavy shape, wherein the crests and troughs of each pair of lips engage one another, and wherein the crests and troughs of the lips are arranged so as to be mutually staggered from row to row.

3. A holder as claimed in claim 1, wherein the elongated sides of the slit are formed by housing parts of a plastic material, and wherein the lips are made by way of injection moulding of an elastomeric material and are thereby permanently connected to the associated housing part.

4. A holder for receiving and retaining tools, writing utensils, kitchen utensils and the like elongated articles, where the holder comprises a housing with an elongated slit for receiving the articles, said slit having elongated sides and being defined by a flexible lip projecting from the respective elongated sides of said slit, and where said lip is adapted to abut both sides of the article(s), wherein the holder comprises several rows of lips extending substantially in parallel, said lips being arranged in pairs opposite one another and presenting a mutually complementary, substantially wavy shape, wherein the crests and troughs of each pair of lips engage one another, and wherein the housing comprises parts that are hingedly interconnected and comprise co-operating releasable locking means for retaining said housing parts in an interconnecting position while forming the slit.

5. A holder as claimed in claim 4, wherein the hinged connection is provided by means of a film hinge cast integral with the housing parts.

\* \* \* \* \*